United States Patent
Maeda

(10) Patent No.: US 8,200,068 B2
(45) Date of Patent: Jun. 12, 2012

(54) DIGITAL TELEVISION

(75) Inventor: Kenichi Maeda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1566 days.

(21) Appl. No.: 11/646,410

(22) Filed: Dec. 28, 2006

(65) Prior Publication Data

US 2007/0147773 A1   Jun. 28, 2007

(30) Foreign Application Priority Data

Dec. 28, 2005   (JP) .................................. 2005-379551

(51) Int. Cl.
*H04N 5/76* (2006.01)
(52) U.S. Cl. ................... 386/291; 386/326; 386/E5.002
(58) Field of Classification Search ................ 386/83, 386/123, 291, 326, E5.002
See application file for complete search history.

(56) References Cited

U.S. PATENT DOCUMENTS

| | | | | |
|---|---|---|---|---|
| 7,272,295 B1 * | 9/2007 | Christopher | ................... | 386/251 |
| 2003/0123854 A1 * | 7/2003 | Tanaka et al. | ................... | 386/95 |
| 2005/0185936 A9 * | 8/2005 | Lao et al. | ...................... | 386/117 |
| 2005/0259746 A1 * | 11/2005 | Shinde et al. | ............ | 375/240.25 |
| 2006/0159425 A1 * | 7/2006 | Choi | ............................... | 386/94 |

FOREIGN PATENT DOCUMENTS

| | | | |
|---|---|---|---|
| GB | 2250156 A | * | 5/1992 |
| JP | 11-353794 A | | 12/1999 |
| JP | 2002-010193 A | | 1/2002 |
| JP | 2004-078946 A | | 3/2004 |

* cited by examiner

*Primary Examiner* — Thai Tran
*Assistant Examiner* — Girumsew Wendmagegn
(74) *Attorney, Agent, or Firm* — Pillsbury Winthrop Shaw Pittman, LLP

(57) ABSTRACT

When recording image data inputted from a plurality of data ports and a clock port, for a data port at which the data value has not changed over a predetermined time period, the data value at that data port and a data item which indicates that this data value has continued unchanged are recorded. Furthermore, time instant information is recorded for such a data port at which the data value has ceased to change. Moreover, the value of the transfer rate of the clock signal is recorded. By doing this, the transfer rate is substantially enhanced, and it is possible to anticipate effective utilization of the storage capacity due to elimination of the recording of useless image data.

1 Claim, 4 Drawing Sheets

DIGITAL TELEVISION

CROSS REFERENCE

This Nonprovisional application claims priority under 35 U.S.C. §119(a) on Patent Application No. 2005-379551 filed in Japan on Dec. 28, 2005, the entire contents of which are hereby incorporated by reference.

BACKGROUND OF THE INVENTION

The present invention relates to an image recording device which simultaneously records data relating to a plurality of images.

Image recording devices which simultaneously record data for a plurality of image signals at the same time are disclosed in, for example, Japanese Laid-Open Patent Publication 2004-078946, Japanese Laid-Open Patent Publication 2002-010193, and Japanese Laid-Open Patent Publication H11-353794.

The invention disclosed in the above described Japanese Laid-Open Patent Publication 2004-078946 relates to an image data recording and replay system and method, and discloses a structure which makes it possible to input and output data continuously and to perform a plurality of inputs and outputs simultaneously while also enhancing the apparent internal data transfer speed, and with which it is possible to increase the number of inputs and outputs which are handled at the same time.

The invention disclosed in the above described Japanese Laid-Open Patent Publication 2002-010193 relates to a data recording and replay device and method, and discloses an AV server which comprises a recording medium capable of non-linear access, and a plurality of input and output processing units which perform input an output of data to and from that recording medium.

The invention disclosed in the above described Japanese Laid-Open Patent Publication H11-353794 relates to a general purpose storage device, and discloses a device which is adapted to be able to perform dubbing in a simple and easy manner between recording media of the same type and between recording media of different types.

Generally, with an image recording device which records image data to storage such as a hard disk or the like, it is desirable to make the number of inputs (the number of ports) at which it is possible to perform simultaneous image recording as great as possible, and moreover also to make the time period over which image recording is possible as long as possible. However, when recording image data which is inputted from a plurality of data ports, the transfer rate of this data is determined by "number of data ports"×"clock frequency".

With the technical contents disclosed in the above described three publications, it is not possible to enhance the above described transfer rate.

In other words although, with the image data recording and replay system and method disclosed in Japanese Laid-Open Patent Publication 2004-078946, the storage device capacity is economized by compressing and expanding the data from input and output terminals for a plurality of channels, since the compression ratio is determined by the compression and expansion method, accordingly there has been the problem that, depending upon the states of the image data streams inputted to the plurality of ports, it has not necessarily been possible to obtain a high compression effect.

With the data recording and replay device and method disclosed in Japanese Laid-Open Patent Publication 2002-010193, although it is arranged to process data inputted within a plurality of time slots which are respectively allocated in advance to a plurality of input and output processing units, and to record this data upon a recording medium, there is no disclosure with regard to compression of the rate of data transfer by a plurality of transfer ports.

With the general purpose storage device disclosed in Japanese Laid-Open Patent Publication H11-353794, likewise, there is no disclosure with regard to compression of the transfer rate, since this invention only pertains to performing format conversion by providing bidirectional input and output ports consisting of, at least, a single connector which is connected to both an A/D converter and a D/A converter.

A feature of the present invention is to provide an image recording device which is adapted to perform recording of image data using a plurality of data ports at a substantially enhanced transfer rate, and which moreover is adapted to be able, by performing data compression, to perform image recording of a plurality of streams of image data over a long time period to a recording medium whose capacity is limited.

SUMMARY OF THE INVENTION

According to the present invention, there is provided an image recording device, comprising: a plurality of data ports which input image data streams; a clock port which inputs a clock signal; a steady data recording means which, for a data port of which the data value has not changed over a predetermined time period, records the data value of the data port; and a data item which indicates the fact that this data value has continued unchanged; and a changing data recording means which, for a data port of which the data value changes within the predetermined time period, records the data values at the timing of the clock signal.

DETAILED DESCRIPTION OF THE INVENTION

An image recording device according to an embodiment of the present invention will now be explained with reference to FIGS. 1 through 4.

Figure 1:
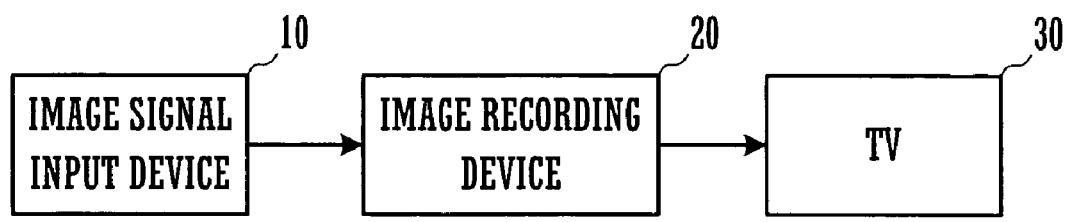
FIG. 1 is a block diagram showing the structure of a recording and replay system for image data which includes an image recording device according to an embodiment of the present invention.

FIG. 1 is a block diagram showing the overall structure of an image recording and replay system which includes this image recording device according to an embodiment of the present invention. In this figure, an image signal input device 10 may consist of, for example, a plurality of tuners which receive, for example, broadcast programs, or a tuner which receives a plurality of programs simultaneously, or the like, and this input device 10 inputs a plurality of image data streams simultaneously to an image recording device 20. And this image recording device 20 records this plurality of image data streams, and, at a required time point, replays them and outputs them to be displayed upon a television receiver 30.

Figure 2:
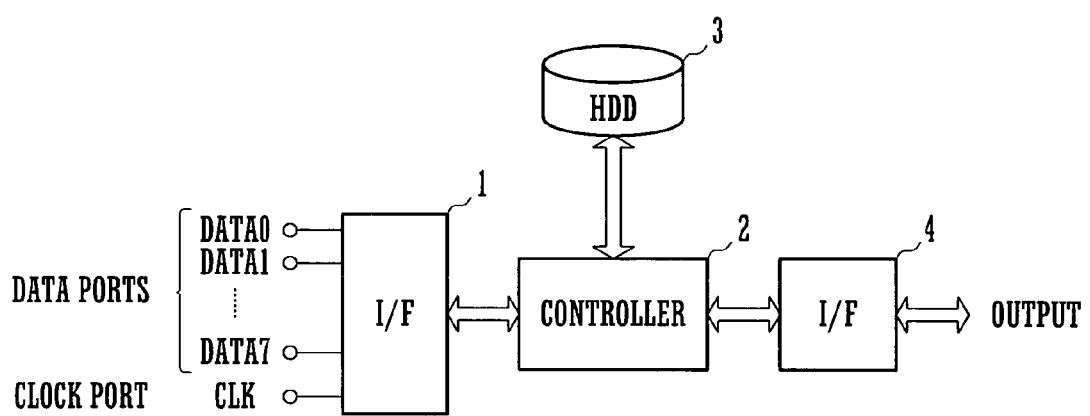
FIG. 2 is a block diagram showing the structure of this image recording device.

FIG. 2 is a block diagram showing the structure of this image recording device. Herein, a hard disk device 3 is a recording device which records image data and a clock signal, and a controller 2 performs recording and read out control for this hard disk device 3. An input interface 1 comprises a plurality of data ports DATA0 to DATA7 and a clock port CLK. The controller 2 reads in the data values at each of the ports via an interface 1, stores the data and a frequency of the clock signal on the hard disk device 3, and performs processing as will be described hereinafter. And the controller 2 replays image data recorded upon the hard disk device 3 and outputs this data to the exterior via an interface 4. It is possible to store the clock signal as it is on the hard disk device 3.

Figure 3:
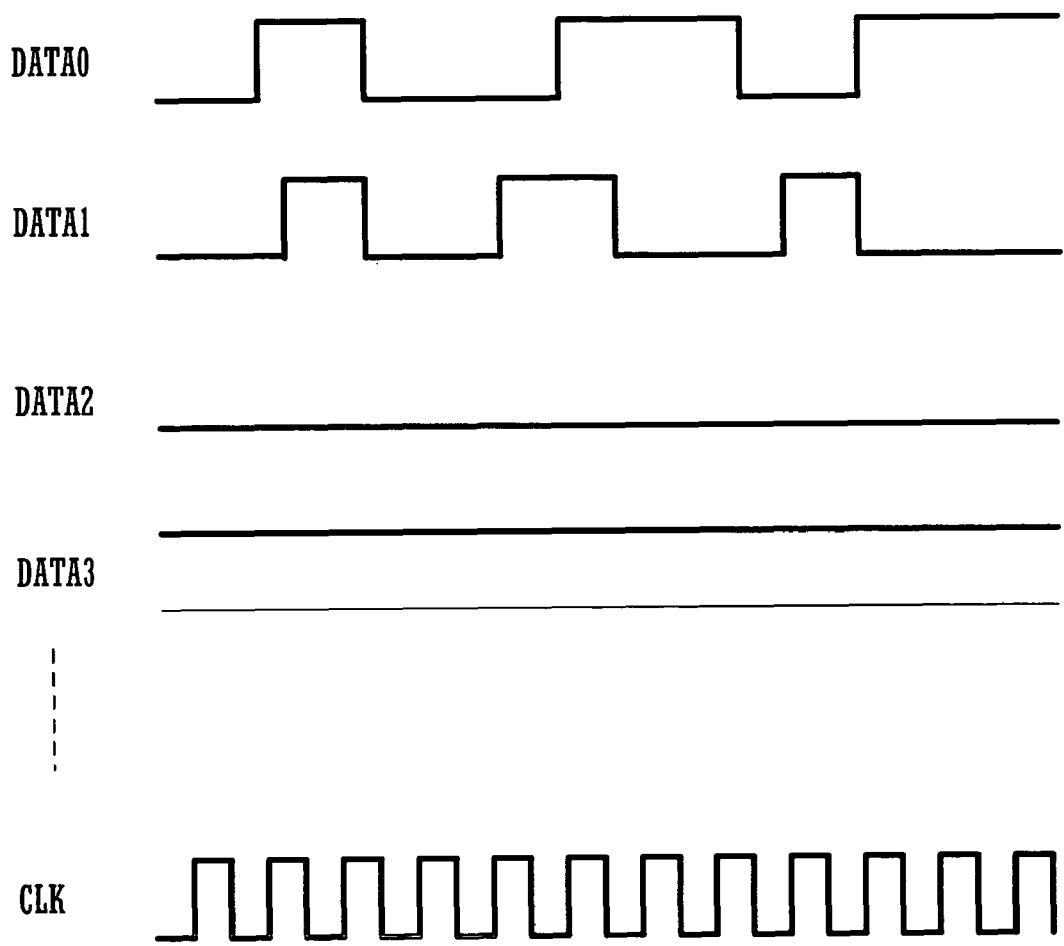
FIG. 3 is a figure showing examples of timing charts for signals inputted to certain ports of this image recording device.

FIG. 3 is a timing chart showing an example of the changes over time of the data values at certain ones of the ports shown in FIG. 2. In this example, significant image data is being inputted at DATA0 and DATA1, and these data values change along with the passage of time. Upon DATA2, the data value "0" is continuously inputted. And, upon DATA3, the data value "1" is continuously inputted. A clock signal of a constant frequency (a rectangular wave signal) is inputted to the clock port CLK.

Figure 4:
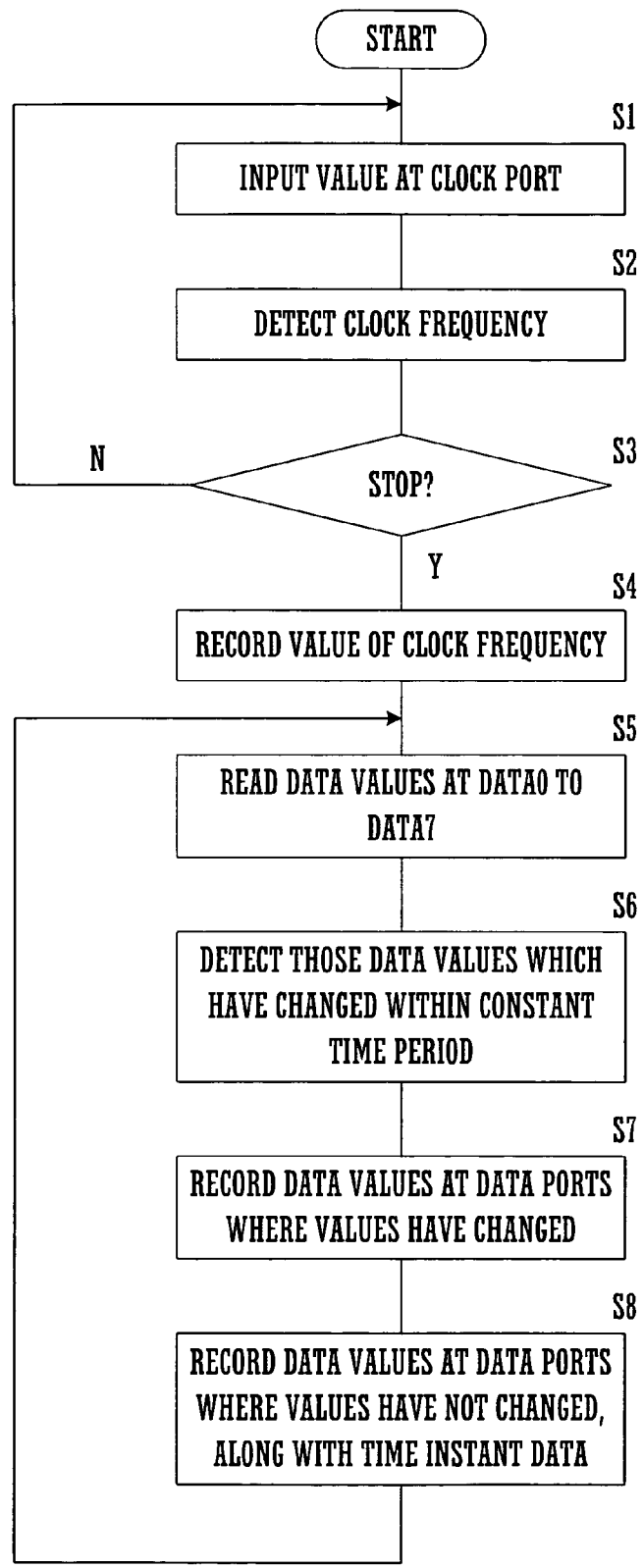
FIG. 4 is a flow chart showing the details of processing by a controller of this image recording device.

FIG. 4 is a flow chart showing the details of the processing performed by the controller 2 shown in FIG. 2. First, the value at the clock port CLK is read in, and the clock frequency is detected by the number of times that this value changes within a fixed time period (steps S1→S2→S3→S1→. . .). Thereafter, the value of this clock frequency which has been detected is recorded (step S4).

Furthermore, the data values at the data ports DATA0~DATA7 are each read in synchronization with the timing of the clock signal inputted at the clock port CLK (step S5). Those ones of the data ports at which the read in data value has changed during a fixed time period (for example a few seconds to a few tens of seconds) are detected, and those ones of the data ports at which the values have not thus changed are also detected (a step S6). And the data value at a data port at which the data value has changed is recorded just as it is (step S7). On the other hand, with regard to the data value at a data point where the data value has not changed within the fixed time period, this data value is recorded along with time instant data for the time point at which it ceased to change (step S8). This time instant data also serves as data which indicates the fact that, from that time instant, this data value has continued unchanged.

Subsequently, when the data values at the above described data ports are again read in, the above processing is repeated in accordance with these values.

When replaying image data which has been recorded in this manner, the value of the clock frequency described above is read out, and, for the input data from the data ports at which the data value has changed, the image data is replayed by sequentially reading out the recorded data values which are recorded at the above described clock frequency. Furthermore, for the input data from the data ports at which the data value has not changed, the original image data (or the no-signal state) is recreated by continuously outputting its recorded data value from the time point which corresponds to its starting time instant as recorded.

With regard to replaying of the data values which are inputted from a data port at which change of the data value has occurred, it should be understood that, since it is possible for the elapsed time from the start time of image recording to be calculated according to the number of data items and the clock frequency, accordingly it is not necessary to append any time instant information to these data values.

Although, in the example shown in FIG. 4, it was arranged, for a data port at which the data value has not changed over a fixed time period, to record, along with a data item which indicates that this data value has continued unchanged, also time instant data for the time point at which this state of affairs started to be the case, it would also be acceptable, if a data port is known in advance as being one at which input data will not be inputted, and this designation has been made by a port designation key connected to the controller 2, for information to be recorded which indicates the fact that there has been no input of image data for the corresponding data port. By doing this it becomes possible, when replaying the input data for this input port, to output the fact that no image data was input. Furthermore it would also be acceptable to arrange, if a designation of a data port at which data input will be performed has been made by the port designation key, to record the data values sequentially at the timing of the clock signal, unconditionally without performing the detection shown in the step S6 of change of the data value within the fixed time period.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. An image recording device, comprising:
    a plurality of data ports which input streams of image data;
    a clock port which inputs a clock signal;
    a storage device for storing the image data and the clock signal;
    replay means which replays the image data stored in the storage device;
    clock signal recording means which records a frequency of the clock signal on the storage device;
    steady data recording means which, for a data port of which the data value has not changed over a predetermined time period, records on the storage device:
        the data value of the data port,
        a data item which indicates the fact that this data value has continued unchanged, and
        time instant information for the time point at which the changing of the data value stopped;
    changing data recording means which, for a data port of which the data value changes within the predetermined time period, records on the storage device the data values of the timing of the clock signal; and
    port designation means which designates, from among the plurality of data ports, data ports for which recording is to be performed and data ports for which recording is not to be performed,
    wherein the steady data recording means and the changing data recording means perform recording only for data ports designated by the port designation means as being data ports for which recording is to be performed.

* * * * *